(12) United States Patent
Dorfman et al.

(10) Patent No.: US 6,563,912 B1
(45) Date of Patent: May 13, 2003

(54) SYSTEM AND METHOD FOR PROVIDING INTEGRATED MESSAGING

(75) Inventors: Alexander Dorfman, Brea, CA (US); Jeffrey Wayne Pence, Fullerton, CA (US); Hao-Yang Feng, Gardena, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 0 days.

(21) Appl. No.: 09/260,696

(22) Filed: Mar. 2, 1999

(51) Int. Cl.[7] .............................................. H04M 11/00
(52) U.S. Cl. ................... 379/88.13; 379/88.17; 379/88.25; 379/93.24; 379/88.12
(58) Field of Search .......................... 379/88.12, 88.18, 379/88.22, 88.17, 67.01, 68, 88.11, 88.14, 88.13, 93.24, 100.08

(56) References Cited

U.S. PATENT DOCUMENTS

| | | | | |
|---|---|---|---|---|
| 4,602,129 A | * | 7/1986 | Matthews et al. | 379/84 |
| 5,530,740 A | * | 6/1996 | Irribarren et al. | 379/89 |
| 5,951,638 A | * | 9/1999 | Hoss et al. | 709/236 |
| 5,958,005 A | * | 9/1999 | Thorne et al. | 709/202 |
| 6,085,231 A | * | 7/2000 | Agraharam et al. | 709/206 |
| 6,233,318 B1 | * | 5/2001 | Picard et al. | 379/88.17 |
| 6,304,636 B1 | * | 10/2001 | Goldberg et al. | 379/88.14 |

* cited by examiner

*Primary Examiner*—Fan Tsang
*Assistant Examiner*—Simon P. Sing
(74) *Attorney, Agent, or Firm*—Morrison & Foerster LLP

(57) ABSTRACT

A voice server and method for providing integrated voice mail and email messaging for use with an email server and an email client. The voice server includes a telephone interface means for providing telephone services to the voice server, a network interface means for providing communications between the voice server and each of the email server and email client, a processor, and a program memory for storing program instructions for controlling the processor to provide voice mail messaging services for a plurality of voice mailboxes. At least one voice mailbox on the voice server is adapted to create a message reference to uniquely identify each recorded voice mail message and to send each message reference to an email address on the email server, where the message can be retrieved by the email client. The voice server is further adapted to provide voice mail services corresponding to each recorded voice mail message, to the email client through the network interface means. Alternatively, the voice server may include at least one voice mailbox that is adapted to forward each recorded voice mail message as part of an email message, to a designated email address on the email server, where it can be retrieved by the email client. The email message in this alternate embodiment is adapted so that the email client can play the voice mail message.

4 Claims, 8 Drawing Sheets

SYSTEM AND METHOD FOR PROVIDING INTEGRATED MESSAGING

BACKGROUND OF THE INVENTION

1. Field of the Invention

The present invention relates to computer telephony systems and methods, and more particularly to a system and method for integrating voice and fax messages with email messages.

2. Description of the Related Art

Voice mail systems have been widely used in businesses to provide voice messaging and facsimile messaging. In addition, individuals are increasingly using voice mail services in their homes, replacing conventional answering machines, and on their cellular telephones. Voice mail services are typically provided by a central voice server connected to a public switched telephone network, allowing access to individual voice mailboxes from most telephones worldwide.

Electronic mail ("email") has also increased in popularity among both businesses and individuals for personal use. Businesses typically provide email through an email server connected to a local area network or through an Internet Service Provider. The Internet has also become more accessible to individuals who often have personal email addresses, in addition to work email addresses. Email messaging has become standardized over the Internet, and now most email messages conform to the Simple Mail Transfer Protocol (SMTP). In addition, most users access their email through a standard email reader, such as Microsoft Mail, Microsoft Outlook, Lotus Notes, or Netscape Mail.

As both forms of messaging have grown in popularity, many individuals have both voicemail and email accounts, with each providing unique advantages. Voicemail is accessible through virtually any telephone, and can thus be accessed remotely from a cellular telephone or a payphone, and is the most common messaging format for conveying audio messages. Email is usually textual or graphical in nature and requires a computer for access. Because individuals often rely on both voicemail and email it would be desirable to integrate the messaging features.

One solution known in the art is to provide a unified messaging system that can be used to retrieve various types of messages. However, such unified messaging systems usually require a proprietary reader program or the replacement of an email server with a specialized unified messaging server. These prior art systems are costly and generally require users to replace their current email reader program.

SUMMARY OF THE INVENTION

The present invention is directed to a system and method for integrating voice and fax messages with email messages that is cost-effective and can be utilized with standard email readers.

In one embodiment, a voice server for providing integrated voice mail and email messaging is provided. The voice server includes a telephone interface for providing telephone services to the voice server, and a network interface for providing communications between the voice server and each of an email server and an email client. The voice server also includes a processor and a program memory for storing program instructions for controlling the processor to provide voice mail messaging services for a plurality of voice mailboxes. At least one of the voice mailboxes is adapted to forward each recorded voice mail message to a designated email address on the email server. The voice mail message is forwarded as part of an email message which is adapted so that the email client can play the voice mail message through speakers on the email client.

In an alternate embodiment, the voice server includes at least one voice mailbox that is adapted to create a message reference to uniquely identify each recorded voice mail message and to send each message reference to a designated email address of the email client. The message reference is forwarded as part of an email message. The voice server is further adapted to provide voice mail services corresponding to each recorded voice mail message to the email client through the network interface.

A method for integrating voice mail and email is also provided. The method is for use in a network system including a voice server for providing voice mail services for at least one voice mailbox, an email server for providing email services for a plurality of email addresses, and at least one email client for retrieving email messages from an email address on the email server.

The steps of a first preferred embodiment of the method are performed by the voice server. First, a voice mail message is recorded in the at least one of the voice mailboxes. Next, an email message is created and is addressed to an email address associated with the at least one voice mailbox. The recorded voice mail message is attached to the email message and then the email message is sent from the voice server to the designated email address on the email server. In one embodiment, the voice server operates as an SMTP server and communicates with the email server and email client by sending the receiving messages over the Internet.

The email client is adapted to retrieve the email message, and by utilizing the message reference, can provide services for retrieving and manipulating the voice mail message through the email client. If the voice mail message is in a format that is unreadable by the email client, the voice mail message may be converted to a multimedia audio file by the voice server. The voice server can also verify that the email message was received at the designated email address and delete the voice mail message from the voice mailbox after the email message is properly received by the email server.

In addition, the voice server may also receive email messages. If the voice server receives an email with an attached audio file, the voice server will determine a voice mailbox that should be associated with the email message. The attached audio file would then be saved as a new voice mail message in the determined voice mailbox.

A second preferred embodiment of the method for integrating voice mail and email, performed by the voice server is also provided. After a first voice mail message is recorded in at least one voice mailbox, a first email message addressed to an email address associated with the at least one voice mailbox is created. A message reference for the first voice mail message is then created. The message reference includes data to uniquely identify the first voice mail message on the voice server. Next, the first email message and the message reference from the voice server are sent to the designated email address on the email server. The email client is adapted to retrieve the first email message from the email server, and by utilizing the message reference, provide services for retrieving and manipulating the first voice mail message.

The voice server may also be adapted to receive certain commands from the email client. The voice server may receive a command to download the first voice mail message from the voice server to the email client so that the email client may play the voice mail message through speakers on the email client. The voice server may also receive a command to play the first voice mail message over a designated telephone. The voice server will then place a call to the designated telephone and play the first voice mail message over the telephone after the telephone call is answered.

The voice server is also adapted to receive a command to reply to the voice mail message over a designated telephone. In such a case, the voice server will place a call to the designated telephone and record a second voice mail message over the telephone after the telephone call is answered. The second voice mail message is then saved in the voice mailbox of the party that left the first voice mail message.

The user of the email client may reply to the voice mail message through email. The email client will send a reply command to the voice server, including a message file. Upon receipt of the command and message file, the voice server will save the message file as a second voice mail message in the voice mailbox of the party that left the first voice mail message. If the message file is in a text format, then the voice server may convert the message file to an audio format so that the message file may be played over a telephone.

The first voice mail message may also be deleted from the email client. The voice server may receive a delete command from the email client to delete the corresponding first voice mail message. When the first voice mail message is deleted from the voice server, the voice server will create a second email message to the designated email address and include instructions to delete the first email message corresponding and its corresponding message reference. The first email mail message will be deleted when the second email message is processed by the email client.

The voice server and methods described above can also be utilized to integrate facsimile messaging with email messaging in similar manners.

A more complete understanding of the System and Method for Providing Integrated Messaging will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF PREFERRED EMBODIMENTS

In the detailed description that follows, it should be appreciated that like element numerals are used to describe like elements that are illustrated in one or more of the figures.

Figure 1:
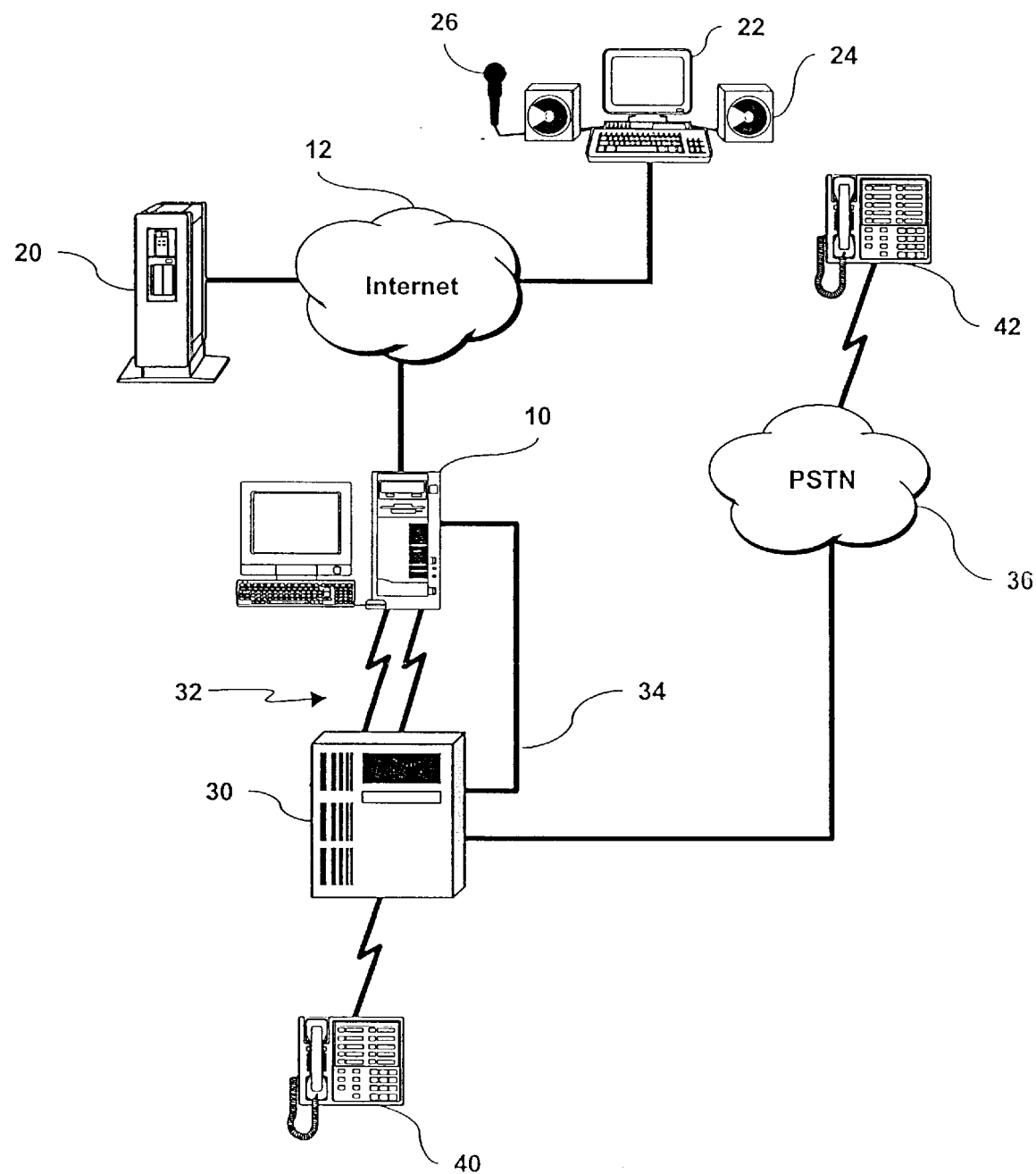
FIG. 1 illustrates an embodiment of the present invention.

The operation of a first preferred embodiment of the present invention will now be described with reference to FIGS. 1–4. As illustrated in FIG. 1, a voice server 10 is connected to a network 12, allowing the voice server 10 to communicate with other devices connected to the network 12, including an electronic mail server 20 (email server) and an email client 22. In the first preferred embodiment, the network 12 is the Internet, but the network 12 could alternatively be any other configuration that allows for communications between the voice server 10, the email server 20 and the email client 22, such as a local area network or a wide area network.

The voice server 10 is also connected to a telephone switch 30. In the first preferred embodiment, the telephone switch 30 is a private branch exchange (PBX), but the telephone switch 30 can also be a key telephone system, public switched telephone network or other telephone systems known in the art. As known in the art, a PBX is a telephone switching system that interconnects telephone extensions to each other, as well as to an outside telephone network, such as a public switched telephone network (PSTN) 36. The telephone switch 30 is connected to the voice server 10 through phone connections 32 and a Simplified Message Desk Interface (SMDI) serial link 34. The phone connections 32 provide telephone services between the voice server 10 and the telephone switch 30. The SMDI serial link 34 provides a high-speed communications link between the voice server 10 and the telephone switch 30.

The voice server 10 is a general purpose computer that includes a processor, a program memory for storing program instructions for controlling the processor, and a hard drive for storing data such as voice mail messages. A voice digital signal processor (DSP) and a fax DSP may also be provided to process voice and fax messages, respectively. Processor boards are well known in the art and are available from companies such as Dialogic Corporation, Parsippany, N.J. A voice server than can be used in accordance with the first preferred embodiment of the present invention is described in detail in co-pending application Ser. No. 09/177,407, filed Oct. 23, 1998, entitled COMPUTER TELEPHONY SYSTEM AND METHOD, incorporated herein by reference.

In accordance with the first preferred embodiment, the voice server 10 is programmed to operate as a voice mail system for at least one user having at least one voice mailbox on the voice server 10. In addition, the voice server 10 is programmed to operate as an SMTP server, allowing the voice server 10 to send and receive messages over the Internet. For example, on startup of the voice server 10, an application may be executed on an independent thread to create a Transmission Control Protocol/Internet Protocol (TCP/IP) socket. The thread would then wait for a network connection on that socket, and when a connection is requested by a client (e.g., when an email message is received) a "protocol" thread may be created to handle the requested connection. The protocol thread of the first preferred embodiment runs the SMTP protocol to receive the message and deliver it to a destination voice mailbox, and terminate after a message has been processed. It should be appreciated that other email standards and protocols may also be used by the voice server 10 to send and receive messages.

The email client 22 of the first preferred embodiment is a programmed general purpose computer, including a processor, a memory, a display and an input device such as a keyboard. The workstation is programmed to execute an email reader, such as Lotus Notes or Microsoft Outlook, which is configured to retrieve and manipulate email messages from the email server 20. Although virtually any email reader and email server may be utilized in accordance with the teachings of the present invention, in the first preferred embodiment the email server 20 is an SMTP-compatible email server, and the email reader is capable of retrieving and manipulating email messages from the SMTP-compatible email server. The email client 22 can also include one or more speakers 24 and a microphone 26.

In operation, a caller 40, connected to the PBX 30, dials the telephone extension of a user of the voice server 10. Alternatively, a remote caller, such as caller 42, may be connected to the voice server 10 through the PSTN 36 and the telephone switch 30. The voice server 10 presents the caller 40 with a voice mail interface in accordance with the configuration of the user's voice mailbox. For example, the caller 40 may be presented with the option of recording a voice mail message for the user. In the first preferred embodiment, the voice mailbox can also be configured to forward recorded voice mail messages to a designated email address so that the recorded voice mail messages may be retrieved by the user through an email reader.

Figure 2:
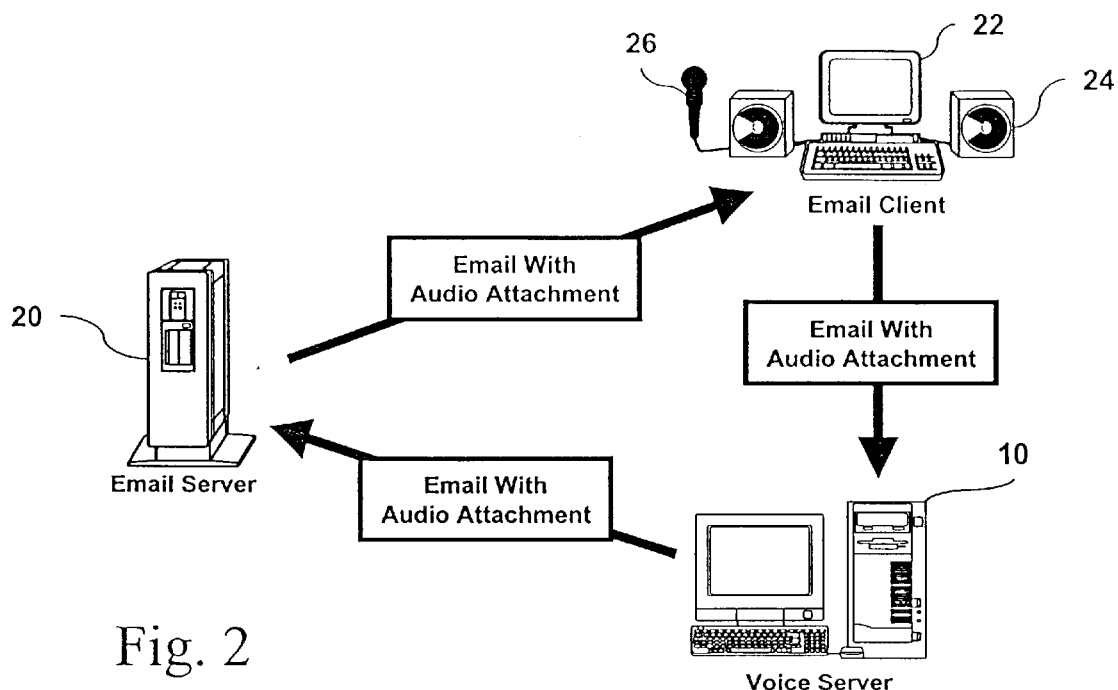
FIG. 2 illustrates the flow of information between a voice server, an emailserver and an email client in a first preferred embodiment of the present invention.
Figure 5:
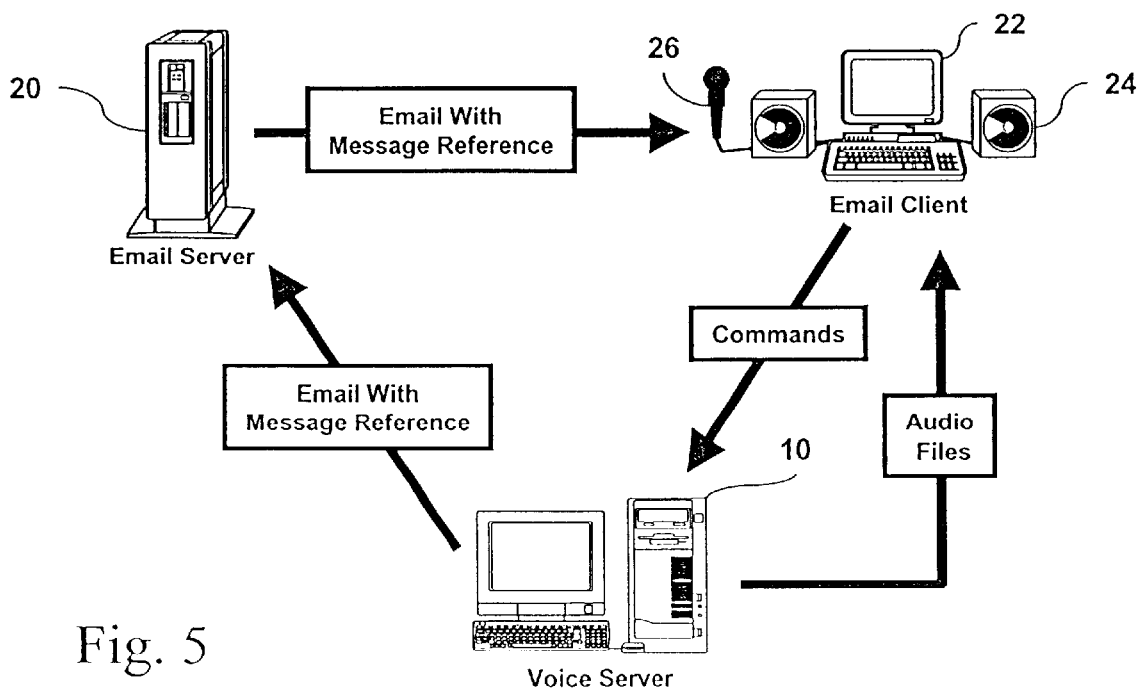
FIG. 5 illustrates the flow of information between a voice server, an email server and an email client in a second preferred embodiment of the present invention.
Figure 3:
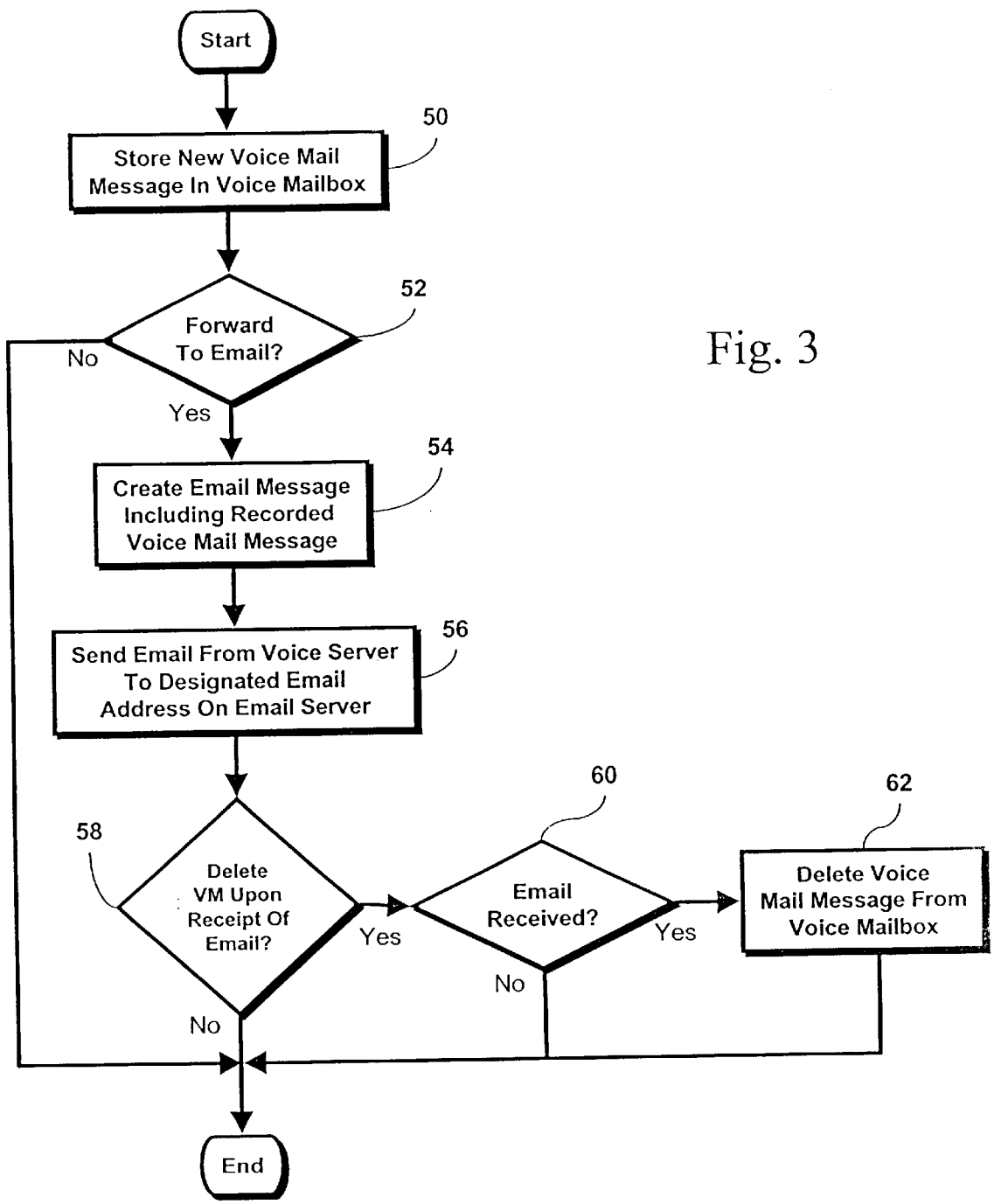
FIG. 3 is a flow diagram of the steps performed by the voice server in the first preferred embodiment when a new voice mail message is recorded.

After the caller 40 records a voice mail message for the user, the voice server 10 performs the functions outlined in the flow diagram of FIG. 3, which will now be described with reference to FIG. 2, which illustrates the flow of information between the voice server 10, the email server 20 and the email client 22. At step 50, the recorded voice mail message is stored in the user's voice mailbox. Next, at step 52, the voice server 10 determines whether to forward the recorded voice mail message to email in accordance with the voice mailbox configuration. If the voice mailbox is not configured to forward the recorded voice mail message to a designated email address, then no further processing is required. However, if the voice mailbox is configured to forward the recorded voice mail message to email, a new email message is created at step 54, including the recorded voice mail message. In the preferred embodiment, the recorded voice mail message is included as an email attachment. The email message is then sent to an email address on the email server 20, as designated by the voice. mailbox configuration at step 56. The voice mailbox may also be configured to cause the stored voice mail message to be deleted after the email is received at the designated email address (steps 58–60), to avoid the duplication of messages between voice mail and email.

When the user starts the email reader from the email client 22, and connects to the email server 20 over the network 12, the email messages in the user's email account are downloaded to the email client 22. When the user opens the message that was forwarded by the voice server 10, the voice mail message will appear as an audio file attachment, and can be opened by the user with a standard audio playback utility. The header of the audio file attachment specifies the specific digitization format of the audio file, and the email client 22 is configured with an audio driver that can play back the audio format of the voice mail message. The user can listen to the voice mail message through the speakers 24 connected to the email client 22. Thus, the user can retrieve all of his or her voice mail through a standard email reader in the same manner that other email attachments are accessed.

Figures 4, 6:
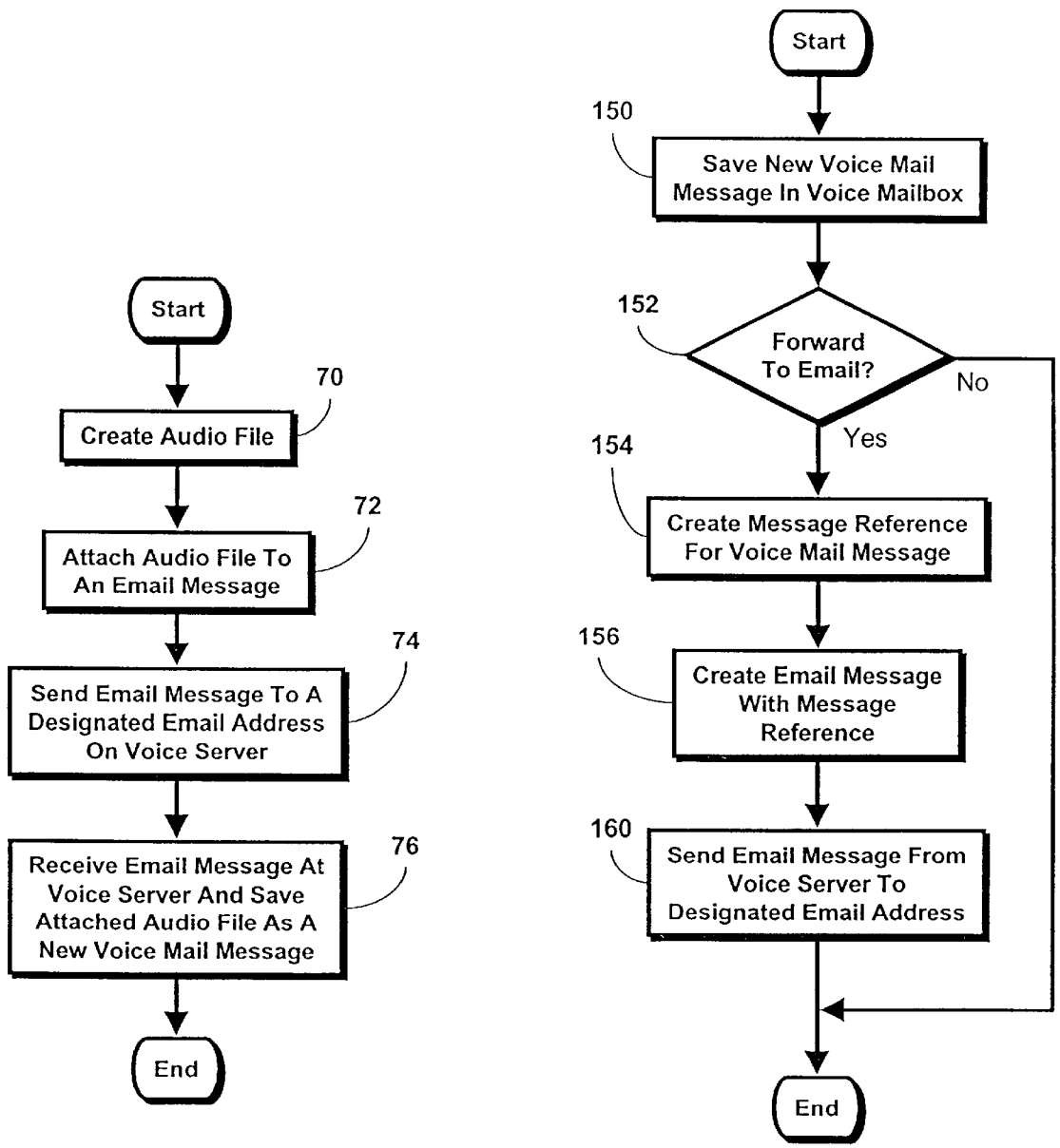
FIG. 4 is a flow diagram illustrating the steps for replying to a voice mail message in the first preferred embodiment.
FIG. 6 is a flow diagram illustrating the logic executed by the voice server in the second preferred embodiment when a new voice mail message is recorded.
Figure 7:
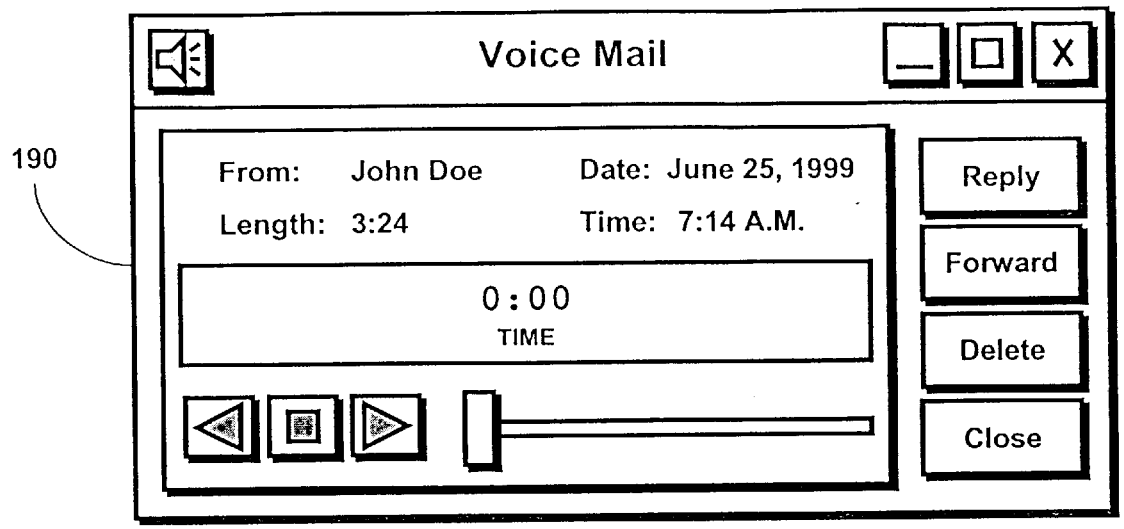
FIG. 7 is illustrates an embodiment of a user interface for manipulating voice mail messages from the email client in the second preferred embodiment.

In the first preferred embodiment, the user can also reply to the voice mail message through the email reader on the email client 22. The algorithm of FIG. 4 illustrates one embodiment of the steps for replying to the voice mail message. First, at step 70, the user records a reply message in an audio file. The reply message can be recorded through the microphone 26 attached to the email client 22, by using a standard recording utility. A new email message is created at step 72, and the audio file is included as an attachment. Most standard email readers include an option to "Reply" to email, and in the preferred embodiment, this feature can be used to automatically create and address the new email message. The email message is then returned to a designated email address on the voice server 10. As discussed above, the voice server 10 is configured to receive email messages and has its own IP address, and each voice mailbox has a unique email address on the voice server 10. Thus, email messages can be addressed and sent directly to a voice mailbox on the voice server 10. At step 76, when the email message is received at the voice server 10, the voice server 10 saves the attached audio file as a new voice mail message in the designated voice mailbox.

Having just described the first preferred embodiment of the present invention, it will be appreciated by those having ordinary skill in the art that numerous modifications, adaptations, and alternative embodiments of the first preferred embodiment may be made within the scope and spirit of the present invention. For example, it should be appreciated that facsimile messages can be retrieved through email in a manner similar to that described above. Each facsimile mailbox may be configured to forward new fax messages to a designated email address. The fax image stored in the mailbox can be sent as an email attachment to the email server 20, and the fax image can be displayed on the screen of the email client 22 through a viewer, such as a TIFF viewer.

In addition, it should be appreciated that file conversion may be necessary. For example, the voice mail message may be in a proprietary digital format that is not compatible with the audio playback utilities of the email client 22. In such a case, the voice mail message can be converted to a standard audio file format, such as a WAV file, before being sent via email to the email client 22. Another example is the conversion of files from text to speech and from speech to text. If the email client 22 does not include the capability to play an audio file, an attempt may be made to convert the voice mail message to a text file, either by the voice server 10 or the email client 22, so that the text of the message may be displayed on the email client 22. Further, a text email message may be converted to an audio file by either the voice server 10 or the email client 22, providing a voice mail user with the ability to retrieve text emails through the voice mail server 10. Because the voice server 10 can receive email messages, the user can configure the email reader to forward incoming email to the user's voice mailbox, allowing the emails to be retrieved over the telephone.

A second preferred embodiment will now be described with reference to FIGS. 5–10c. The second preferred embodiment allows a voice mail message to be retrieved either via telephone access to the voice server 10 or through email, without requiring the duplication of the message on both systems. The logic executed by the voice server 10 when a caller leaves a new voice mail message is illustrated in FIG. 6. After a caller records a voice mail message, the new message is stored in the voice mailbox at step 150. Next, at step 152, it is determined whether the voice mailbox is configured to provide email integration. If email is being used, then a message reference is created at step 154. The message reference uniquely identifies the recorded voice mail message and may include data to describe the type of message (e.g., voice or fax), the location of the message (e.g., server IP address and email address of voice mailbox), and a unique message identifier. An email message is then created, including the message reference. Preferably, the message reference is included as part of the email header at step 156. In an alternate embodiment, the message reference may be an attachment to the email message. At step 158, the voice server 10 sends the email message to an email address on the email server 20 that was designated in the configuration of the voice mailbox.

When the user starts the email reader from the email client 22, and connects to the email server 20 over the network 12, the email messages in the user's email account are downloaded to the email client 22. The email client 22 includes an email reader program for accessing and handling the email messages downloaded from the email server 20. The email reader program of the second preferred embodiment may be any email reader that is compatible with the email server 20 and is capable of being customized to handle message references, such as Lotus Notes or Microsoft Outlook.

In the second preferred embodiment, when an email message including a message reference is identified by the email client 22, the email message is marked (e.g., displayed with an icon) so that the user will recognize that the email message corresponds to a voice mail message. When the user opens the email message, the email reader presents the user with a customized set of options for handling the message reference. For example, the user may be presented with the options illustrated FIG. 7. As illustrated, a window 190 provides the user with options to manipulate the voice mail message, such as play, reply, forward and delete. In addition, other options for controlling the playback of the voice mail message over the speaker 26 may also be provided.

Figure 8:
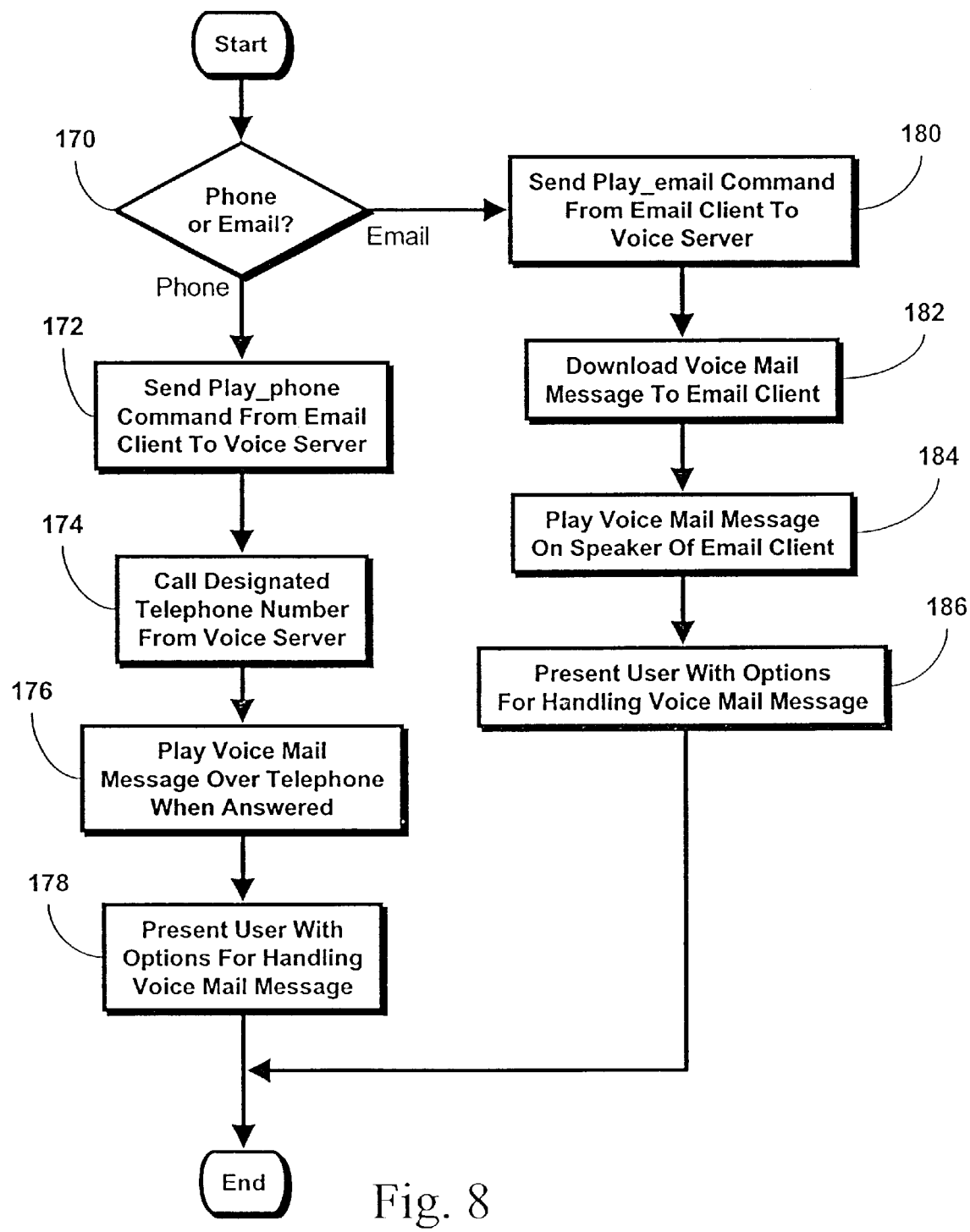
FIG. 8 is flow diagram illustrating the operation of a "play message" command in the second preferred embodiment.

The steps for playing the voice mail message will now be described with reference to the flow diagram of FIG. 8. If the user chooses to play the voice mail message, the user is presented with the option of playing the message over the telephone 42 or over the speakers 26 of the email client 22, at step 170. If the user selects "telephone," the email client 22 will send a play_telephone command to the voice server 10. This command can be sent over the network to the voice server's IP address, and includes information from the message reference so that the voice server 10 will select the corresponding voice mail message and a telephone number at which the voice mail message should be played. When the voice server 10 receives the command, it dials the telephone number designated in the command at step 174. The voice server 10 will then play the voice mail message over the telephone 42 when the telephone 42 is answered. At step 178, the user is presented with a set of options over the telephone for handling the voice mail message.

Referring back to step 170, if the user chooses to play the voice mail message over the speakers 24 of the email client 22, the email client 22 will send a play_email command to the voice server 10, at step 180. The command is sent to the IP address of the voice server 10 and includes information from the message reference to uniquely identify the corresponding voice mail message, as well as the IP address of the email client 22. At step 182, the voice server 10 downloads the voice mail message to the email client 22. The voice mail message may be played on the speakers 24 of the email client 22 at step 184. The email reader may then present the user with a set of options, via the email reader program for handling the voice mail message, such as those illustrated in FIG. 7.

Figure 9:
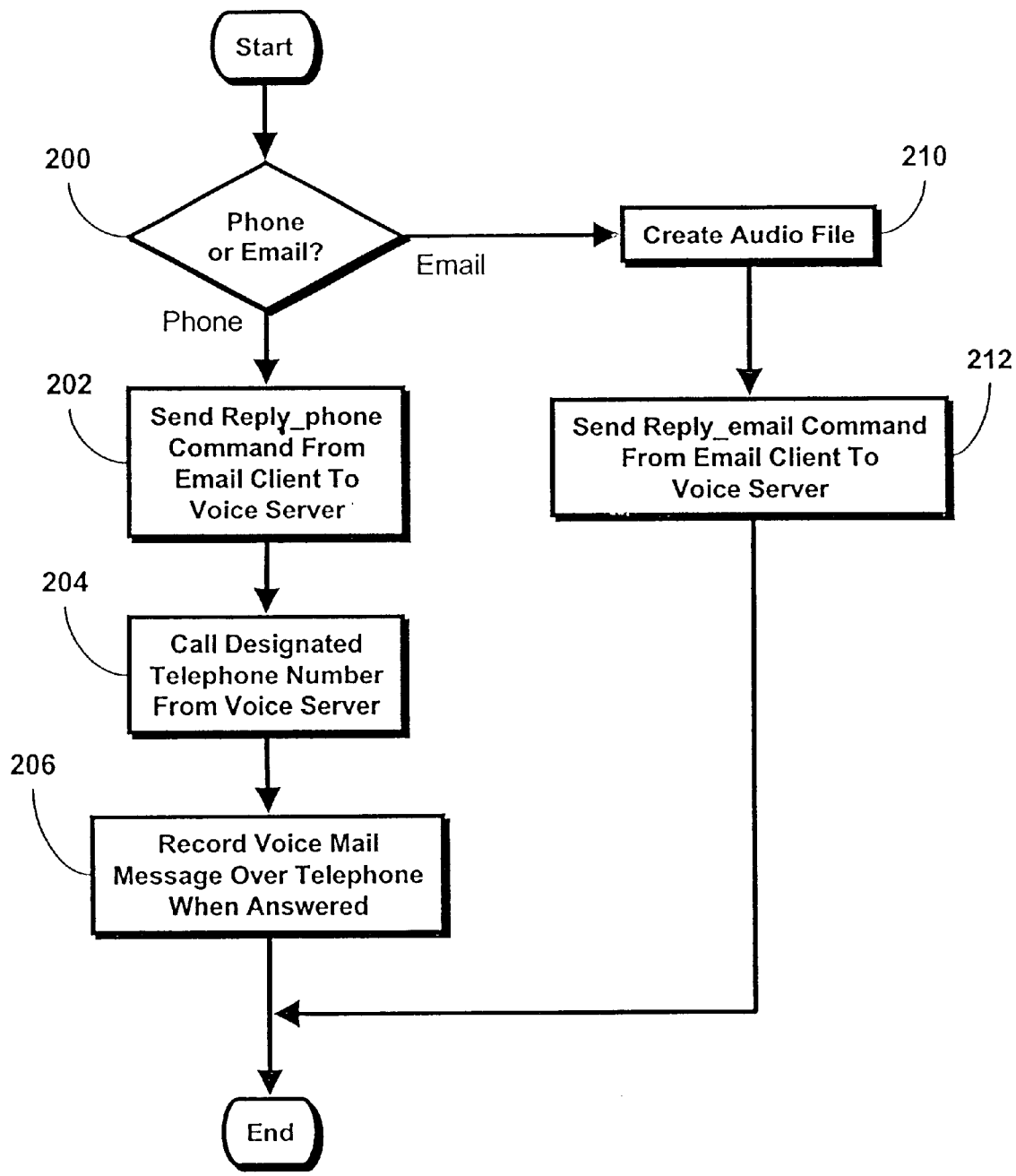
FIG. 9 is a flow diagram illustrating the operation of a "reply to message" command in the second preferred embodiment.

A preferred embodiment of the steps for replying to the voice mail message will now be described with reference to the flow diagram of FIG. 9. When the user chooses to reply to the voice mail message, the user will be presented with the option of replying via email or replying over the telephone 42, at step 200. If the user elects to reply via the telephone 42, then the email client 22 sends a reply_phone command to the voice server 10, including information from the message reference to identify the corresponding voice mail message and the telephone number of the telephone 42. When the voice server 10 receives the command, it calls the designated number at step 204, and the user can record the reply when the telephone 42 is answered at step 206. If the user elects to reply via email, then the user can record an audio reply through the microphone 26 of the email client 22, at step 210. The audio file is then sent to the voice server 10 in a reply_email command at step 212. The voice server 10 will then store the audio file as a voice mail message in the voice mailbox of the party that left the voice mail message.

Figure 10A:
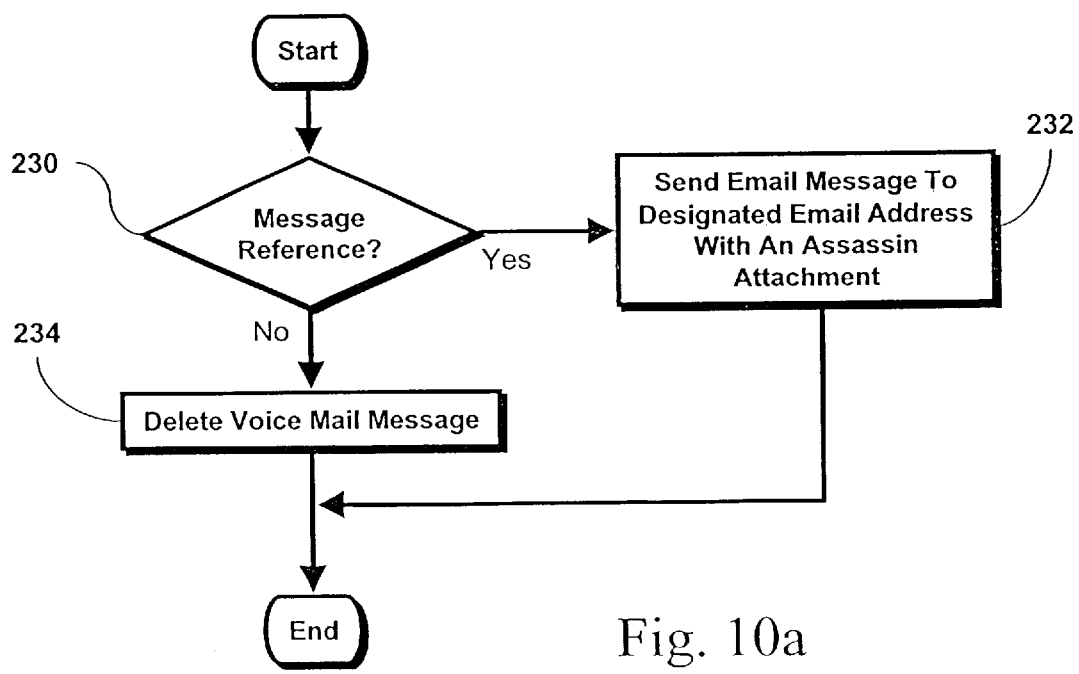
FIGS. 10a–b are flow diagrams illustrating the operation of a "delete message" command in the second preferred embodiment.
Figure 10B:
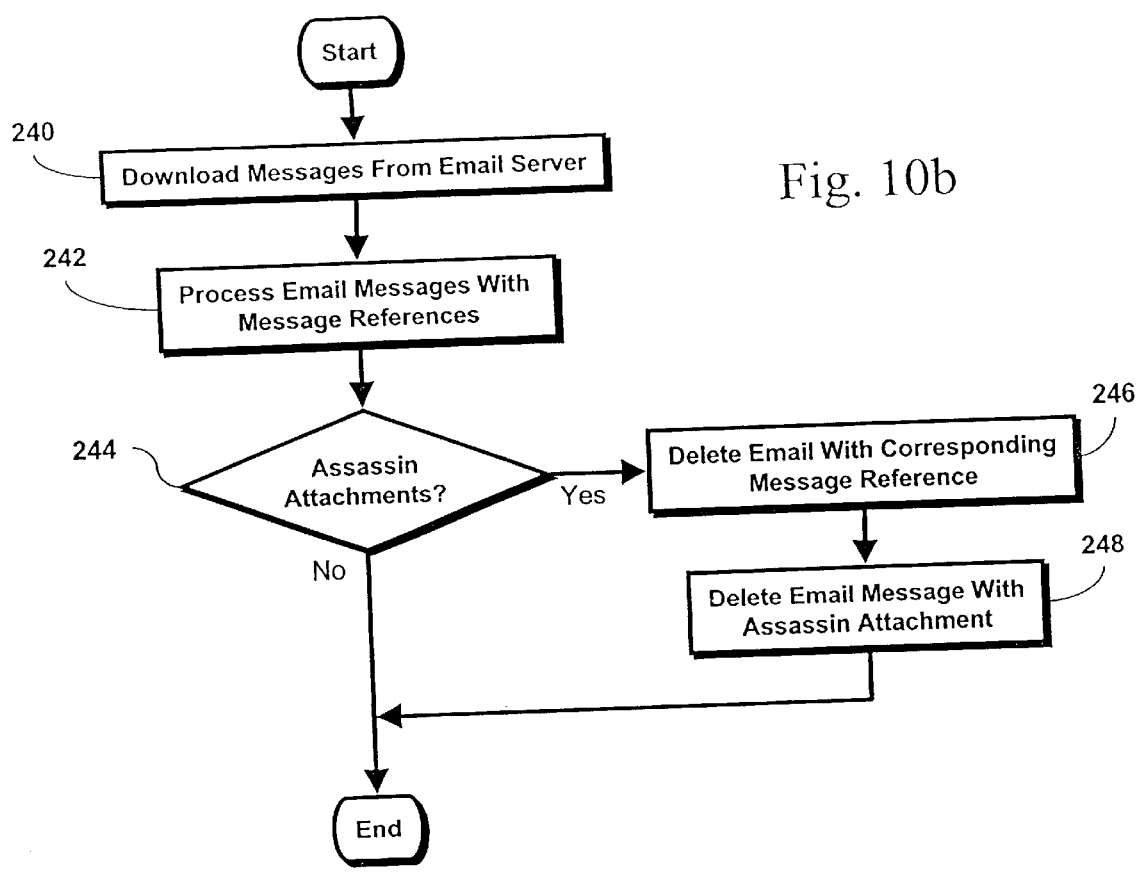

A preferred embodiment of the steps for deleting a voice mail message will now be described with reference to the flow diagrams of FIGS. 10*a*–*c*. FIG. 10*a* illustrates the logic for deleting a voice mail message via telephone. The user dials the voice server 10 and accesses the user's voice mailbox. When the user deletes a voice mail message the voice server 10 determines, at step 230, whether the voice mail message has an associated message reference. If there is an associated message reference, then an email message is created with an "assassin" as an attachment. As will be discussed below, the assassin includes information regarding the message reference and instructs the email client 22 to locate and delete the email message with the corresponding message reference. The email and assassin attachment are then sent to the email address that the original email with the message reference were sent, at step 232. Next, at step 234, the voice mail message is deleted from the voice server 10.

As discussed above, the email reader is a customized version of a standard email reader. The customization includes program logic for performing the steps outlined in FIG. 10*b*, when it connects to the email server 20. At step 240, the email client 22 downloads the new email messages from the email server 20. At step 244, the email client 22 searches the attachments of the new messages for assassins. If an assassin is found, the email message with the corresponding message reference is deleted at step 246. The email message with the assassin attachment is then deleted at step 248.

An alternate embodiment for deleting a voice mail message via telephone will now be described. Each voice message is assigned an associated message ID, and when a voice message is initially created and saved in a voice mailbox, its associated message ID is stored in a message ID file. The voice mail message may then be deleted through standard voice mail facilities. When the email reader is launched, the email client is instructed to read the message ID file stored on the voice server, login to the corresponding voice mailbox on the voice server and verify whether each message ID from the message ID file is still in the voice mailbox. If the message is no longer in the voice mailbox, the message ID is deleted from the message ID file, and the email reader deletes the corresponding email message.

Figure 10C:
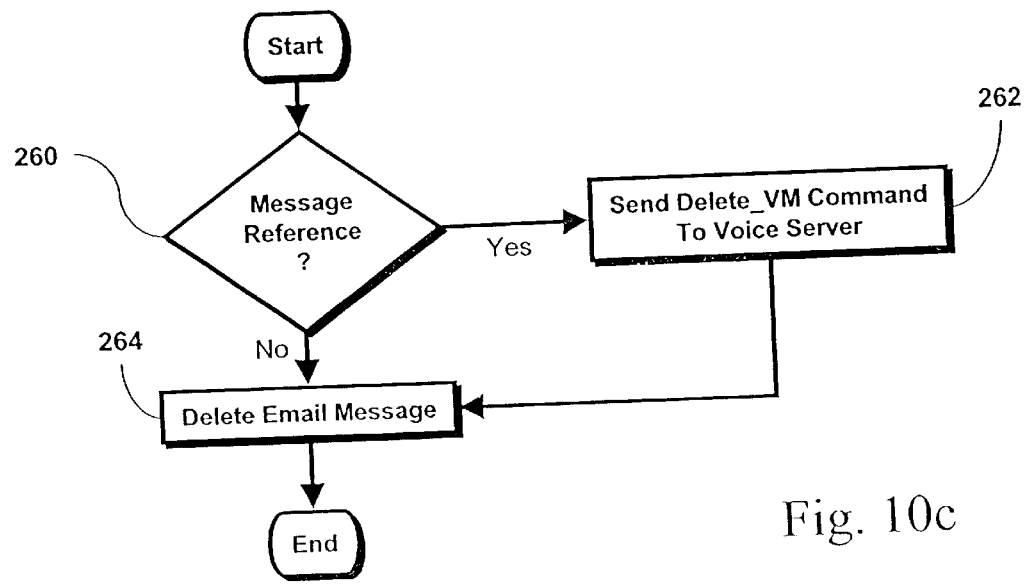

FIG. 10c illustrates the logic for deleting a voice mail message from the email client 22. At step 260, when an email is deleted, a determination is made whether the email has a message reference. If there is such a message reference, then a delete_voicemail command is sent to the voice server at step 262, along with information identifying the voice mail message. The voice server 10 then locates and deletes the voice mail message. Next, at step 264, the email message is deleted.

Having thus described a preferred embodiment of the System and Method for Providing Integrated Messaging, it should be apparent to those skilled in the art that certain advantages of the within system have been achieved. It should also be appreciated that numerous modifications, adaptations, and alternative embodiments thereof may be made within the scope and spirit of the present invention. The above description is presently the best contemplated mode of carrying out the invention. This illustration is made for the purpose of illustrating the general principles of the invention, and is not to be taken in a limiting sense. The scope of the invention is best determined by reference to the following claims.

What is claimed is:

1. In a system comprising a voice server for providing voice mail services for a plurality of voice mailboxes, an email server for providing email services for a plurality of email addresses, and at least one email client for retrieving email messages associated with an email address from the email server, a method for integrating voice mail and email messaging, performed by the voice server, comprising the steps of:

recording a first voice mail message and storing the first voice mail message in at least one voice mailbox;

creating a first email message addressed to an email address associated with the at least one voice mailbox;

creating a message reference for the first voice mail message, the message reference including data to uniquely identify the first voice mail message on the voice server;

sending the first email message and the message reference from the voice server to the associated email address, wherein the email client is adapted to retrieve the first email message from the email server, and by utilizing the message reference, provide services for retrieving and manipulating the voice mail message;

receiving a delete command through the voice mail services provided for the voice mailbox;

sending a second email message to the designated email address, including instructions to delete the first email message and the corresponding message reference; and deleting the first voice mail message.

2. In a network including an email server and an email client for retrieving email from the email server, a system for providing integrated voice mail and email messaging, the system comprising:

a voice server connected to the network, the voice server providing voice mail messaging services to a plurality of voice mailboxes, and comprising a processor, and a program memory for storing program instructions for controlling the processor to perform steps comprising recording a voice mail message and storing the voice mail message in one of the voice mailboxes, creating a first email message addressed to an email address associated with the voice mailbox, creating a message reference for the voice mail message, the message reference including data to uniquely identify the voice mail message on the voice server, sending the first email message with the message reference over the network, from the voice server to the email address, receiving a delete command through the voice mail services provided for the voice mailbox, sending a second email message to the designated email address, including an instruction to delete the first email message and the corresponding message reference, and deleting the voice mail message; and an email reader program for causing the email client to retrieve the email message, and by utilizing the message reference, provide services for retrieving and manipulating the voice mail message through the email client.

3. The system of claim 1, wherein the email reader program further causes the email client to delete the first and second email messages, along with the message reference and delete instructions, after the second email message is received by the email client.

4. The system of claim 2, wherein the network is the Internet and the voice server, email server and email client are each remotely located.

* * * * *